(12) United States Patent
Emelyanov et al.

(10) Patent No.: US 9,667,490 B1
(45) Date of Patent: May 30, 2017

(54) METHOD FOR HIGH AVAILABILITY OF SERVICES IN CLOUD COMPUTING SYSTEMS

(71) Applicant: Parallels IP Holdings GmbH, Schaffhausen (CH)

(72) Inventors: Pavel Emelyanov, Moscow (RU); Stanislav S. Protassov, Moscow (RU); Serguei M. Beloussov, Singapore (SG)

(*) Notice: Subject to any disclaimer, the term of this patent is extended or adjusted under 35 U.S.C. 154(b) by 163 days.

(21) Appl. No.: 14/823,097

(22) Filed: Aug. 11, 2015

Related U.S. Application Data

(63) Continuation-in-part of application No. 13/910,824, filed on Jun. 5, 2013, now Pat. No. 9,106,537.

(51) Int. Cl.
| | |
|---|---|
| *G06F 15/177* | (2006.01) |
| *G06F 15/16* | (2006.01) |
| *H04L 12/24* | (2006.01) |
| *H04L 29/08* | (2006.01) |
| *H04L 29/06* | (2006.01) |

(52) U.S. Cl.
CPC .......... *H04L 41/0816* (2013.01); *H04L 63/10* (2013.01); *H04L 67/10* (2013.01); *H04L 67/18* (2013.01)

(58) Field of Classification Search
CPC ..... H04L 41/0816; H04L 63/10; H04L 67/10; H04L 67/18

USPC .................................................. 709/220, 229
See application file for complete search history.

(56) References Cited

U.S. PATENT DOCUMENTS

| | | | |
|---|---|---|---|
| 8,370,837 B2* | 2/2013 | Emelianov | G06F 9/45558 714/13 |
| 8,654,971 B2 | 2/2014 | Orsini et al. | |
| 8,671,406 B1 | 3/2014 | Gopal et al. | |
| 8,909,800 B1* | 12/2014 | Grebenschikov | G06F 9/45558 709/223 |
| 8,935,506 B1 | 1/2015 | Gopalan | |
| 2013/0276056 A1 | 10/2013 | Epstein | |

* cited by examiner

*Primary Examiner* — Kristie Shingles

(57) ABSTRACT

A method and computer program product for providing High Availability (HA) of services in a cloud-based system. The services are the applications used by the end users of the cloud system. The system uses shared cloud distributed storage. The cloud data is distributed over several nodes and is duplicated in an on-line mode. Each user launches and runs his own Virtual Execution Environment VEE (VM or Container) used as a cloud service. If one of the hardware nodes becomes unavailable, the HA system restores all of the VEEs of the failed node on a functional hardware node. Each node has a daemon, which monitors the situation and, if one of the nodes crashes, a master daemon provides for the restoration of the services of this node on other available nodes of the cloud.

13 Claims, 8 Drawing Sheets

METHOD FOR HIGH AVAILABILITY OF SERVICES IN CLOUD COMPUTING SYSTEMS

CROSS REFERENCE TO RELATED APPLICATIONS

This application is a continuation-in-part of U.S. patent application Ser. No. 13/910,824, filed on Jun. 5, 2013, incorporated herein by reference in its entirety.

BACKGROUND OF THE INVENTION

Field of the Invention

The present invention relates to a High Availability (HA) technology, and, more particularly, to ensuring High Availability of virtual execution environments (VEEs) in a cloud-based infrastructure.

Description of the Related Art

Cloud computing is currently the most common way for efficient and robust method for publishing web services and making them available to users. The cloud computing, advantageously, simplifies deployments of services and makes them more cost-effective and scalable. Depending on the need, a user can choose to use a public cloud or operate a private cloud. The private clouds do not share resources between enterprises, but are owned, used and operated by a single organization.

In the public cloud computing model a special cloud service provider is used by an organization (or an enterprise) to provide cloud services. This provider can share cloud resources between the enterprises, which greatly reduces maintenance costs. The public clouds make it quite easy to scale up and down in order to utilize only required computational units. However, High Availability (HA) of the cloud services is required. the cloud can have a large number of services that need to be always available. This raises an issue of High Availability, which is different compared to HA of a single computer or a server. In the cloud, failure of one node should not affect the functionality of the cloud and the cloud services that are provided.

If one cloud computer running a particular cloud service fails, the cloud service has to automatically launch another instance on another cloud computer. Conventional cloud systems do not have the HA and use manual launches of the failed service on available cloud computers. Typically, the cloud administrator re-launches the services manually, which creates significant delays.

Accordingly, it is desired to have a cloud service with an HA system, that insures minimal and predictable service delays. High availability is a key area of interest for the cloud computing clients. However, the cloud providers usually are responsible only for maintaining the cloud infrastructure and performing backups and restores, if necessary. So, the clients themselves have to set up high availability of the desired cloud services. Accordingly, it is also desired to have a simple HA solution implemented as a part of the cloud, so the clients do not have to worry about availability of the services.

An HA cloud solution has to monitor the services, restart them if necessary and also communicate to the network routing device the new locations of the services if they have changed (IP failover). Solutions for protecting the IT systems from failures are not new by any standard and they have already been implemented in some software products. However, they have disadvantages in being large and not compatible with many cloud solutions. The existing third-party HA systems need to be integrated into the cloud systems. As a result, the public cloud service clients or the maintainers of the private clouds have to complement the cloud solutions with a third-party HA software that may even exist outside of the cloud. This is not the most cost-effective solution or the easiest one to implement.

Accordingly, it is desired to have a cloud services system with its own integrated HA solution.

SUMMARY OF THE INVENTION

The present invention relates to a High Availability (HA) technology, and, more particularly, to ensuring High Availability of virtual execution environments (VEEs) in cloud-based infrastructure that substantially obviates one or more of the disadvantages of the related art.

A method and computer program product for providing High Availability (HA) of services inside a cloud system is provided. The services are the applications used by the end users of the cloud system. The system employs shared cloud distributed storage. The cloud data is distributed over several nodes and is duplicated in an on-line mode. Each user launches and runs his own Virtual Execution Environment VEE (VM or container) used as a cloud service. One of the hardware nodes can become unavailable at any moment. The HA system restores all of the VEEs of the failed node on a functional hardware node. Each node has a daemon, which monitors the situation and, if one of the nodes crashes, a master daemon provides for the restoration of the services of this node on the other available nodes of the cloud.

The HA system uses the shared storage in an exclusive file access mode. The HA system supports a special database containing the data about the services (i.e., configuration and operational service data) stored on the shared distributed storage. The HA uses "exclusive open" command in order to determine that the node has failed. The database is dynamically updated.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
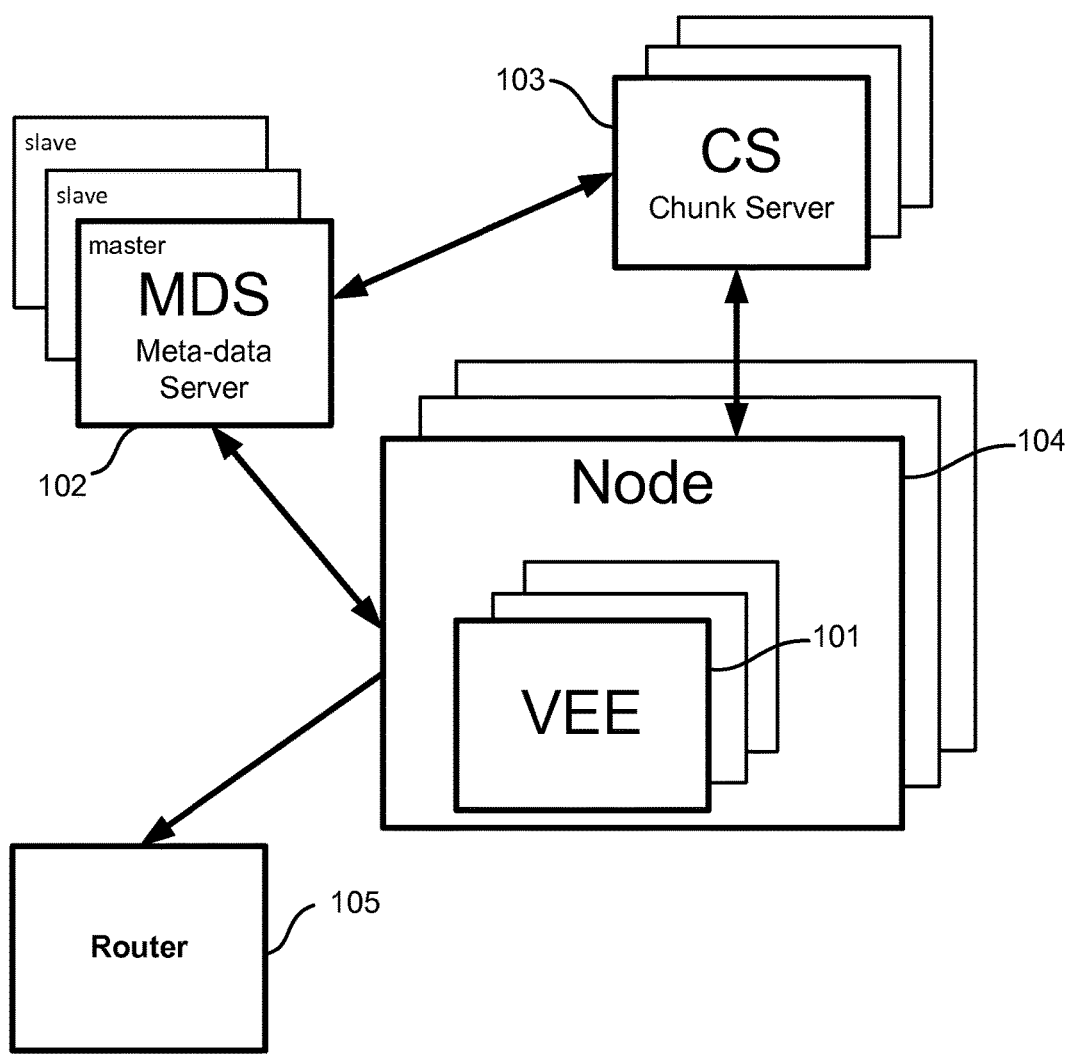
FIG. 1 illustrates a general architecture of a data system, in accordance with the exemplary embodiment.

Reference will now be made in detail to the embodiments of the present invention, examples of which are illustrated in the accompanying drawings.

A method and computer program product for High Availability (HA) of services inside a cloud-based system is provided. The services are the applications used by the end users of the cloud system. The system uses a shared distributed storage. The cloud data is distributed over several nodes and is duplicated in an on-line mode. Each user launches his own Virtual Execution Environment VEE (Virtual Machine (VM) or Parallels Container) used as a cloud service. If one of the hardware nodes becomes unavailable, the HA system restores all of the VEEs of the failed node on a functional hardware node.

VEE—Virtual Execution Environment, a type of environment that supports program code execution, where at least a part of the real hardware and software required for running program code are presented as their virtual analogs. From the point of view of the user, the code in VEE runs as if it were running on the real computing system. An example of VEE is a Virtual Machine (VM).

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor. The Hypervisor controls VM software, while having the highest privilege level for administrating hardware computer resources and Virtual Machines.

VE—Virtual Environment, for example, a Virtual Private Server (VPS), is one type of a Virtual Execution Environment (VEE) running on the same hardware system with a shared OS kernel and most of the system resources, where isolation of Virtual Execution Environments is implemented on the namespace level.

A Container, sometimes known as a Virtual Private Server (VPS), is a closed set, or collection, of processes, system resources, users, groups of users, objects and data structures, that virtualizes an operating system (where typically there is only one instance of an OS on the machine). Each Container has an ID, or some other identifier, that distinguishes it from other Containers. The Container offers to its users a service that is functionally substantially equivalent to a standalone server with remote access. From the perspective of an administrator of the Container, the Container should preferably act the same as a dedicated computer at a data center.

For example, it is desirable for the administrator of the Container to have the same remote access to the server through the Internet, the same ability to reload the server, load system and application software, authorize Container users, establish disk space quotas of the users and user groups, support storage area networks (SANs), set up and configure network connections and webservers, etc. In other words, the full range of system administrator functions is desirable, as if the Container were a dedicated remote server, with the existence of the Container being transparent from the perspective of both the Container user and the Container administrator.

Examples of Virtual Execution Environments are commercially available, for example, from Parallels Software International, Inc., from VMWare, Inc., Xen and from Microsoft Corporation. The present invention is applicable for any kind of virtual execution environments (VEEs) such as containers or virtual machines, and where the VEEs rely on distributed data for their operation.

Each node has a daemon, which monitors the situation, and if one of the nodes crashes, a master daemon organizes the restoration of the services of this node on other available nodes of the cloud. The HA system uses the shared storage in an exclusive file access mode. The HA system supports a special database containing the data about the services (i.e., configuration and operational service data) stored on the shared cloud distributed storage. The HA uses an "exclusive open" command in order to determine that the node has failed.

According to the exemplary embodiment, each node has a daemon working as a background process. The daemon sets a flag "lease" for the node lock file. Each node has a daemon and a file corresponding to this node on the shared storage. As long as the daemon holds this file open in an "exclusive" mode, the node in question is considered to be alive. Once this file can be opened by any other node in the "exclusive" mode, the former node is considered to be dead. This is how a "node crash" event is detected in the exemplary embodiment.

The flag also identifies the node to which the daemon belongs to. The service file is located on the cloud storage (not on the actual node, which is important in a situation when the node crashes—the service file remains alive). The node daemon periodically confirms that it owns the "lease" flag. The confirmation is implemented as a background thread created by the shared-storage access library.

The master daemon knows that a particular node is operational if it cannot open the node lock file. The master node tries to open other nodes' files to check which node has crashed. The periods for confirmation are defined by the HA system so that the actual live process has enough time to confirm possession of the flag. Different confirmation periods can be configured, but setting them below than 15 seconds is not recommended. Note that higher confirmation periods up to several minutes can be used.

According to the exemplary embodiment, only one master daemon is used. If a hardware node that has the master daemon fails, a daemon from another node becomes a master daemon. All daemons try to become the master daemon by sending periodic requests to obtain exclusive ownership of the lock file. If a lock-file is available, it means that there is no master-daemon currently "alive" (i.e., a node that owned the master-daemon has crashed). First daemon which requests this file becomes the master daemon and locks this file from others. The frequency of master overtake is also configured and is recommended to vary between 15 seconds and a few minutes. However, customers usually want to have the fastest reaction they can possibly have. Thus, the 15 second frequency is generally reasonable.

If a node fails, the master daemon detects it and asks the cloud storage for a configuration file. The master daemon reads (from the configuration file) the data about the services of the failed node and launches these services on other available nodes. Subsequently, the master daemon informs the system router of the new addresses of migrated services. Meanwhile, the system attempts to re-start the failed node.

If the node does not restart, the node is marked as broken (i.e., down). The system administrator can deal with this node at a later time (manually). The exemplary embodiment deals with Virtual Execution Environments (VEEs) running on the nodes.

The exemplary embodiment, allows for easy managing of storage of data used by the VEEs providing services to the clients. It also provides data maintenance and recovery, if necessary. To address a difficulty of implementation of the HA in the cloud, the present invention proposes using HA daemons running on top of the cloud storage file system (already installed on many private clouds).

Note that while no new software installation is needed, the daemon code (or component) for files opening needs to be installed. The configuration is relatively easy and user-friendly. The daemons do not need to be deployed and can be just turned on for existing cloud storage clients. This mechanism is achieved by using special file system calls in the cloud system. For example, calls in POSIX notation: open (file_name, O_RDONLY)—open file for reading only; chmod (file_name, 700)—change a file's protection bits—the owner of the file can read, write and execute, but other users cannot. The daemon checks the accessibility of files using a standard open( ) call. The open( ) call returns a value EBUSY, if the file cannot be opened.

According to the exemplary embodiment, if one node has failed, in order to launch the services on another node, the system does not need to have the disk data for a particular service on another node, because this data is already there. The services have a corresponding configuration data (i.e., a metadata). The metadata is a description of a container and services in a format with structure (text or binary format), that can be read by an application for starting the container on another node. The metadata includes the settings and parameters of the VEE and the path to the virtual disk with which the VEE works.

According to the exemplary embodiment, a service needs to be launched on any node in the cluster. Thus, the disk data of this service (the files mentioned above) have to be accessible from any node in the cluster. The HA-save services have their files on the shared storage, and a current state data and settings of the container can be changed during the user operations. The user activity-related data is saved, and after the VEE stops or becomes dead, this data is available for the master daemon.

Thus, the service is restored from the state when it was interrupted when the node failed. If a service cannot restore its state, this state is lost and service starts again from its initial point using default settings.

According to the exemplary embodiment, a file system of the data storage can be NFS, GFS, GPFS, OCFS and other clustered (distributed) file systems. The data stored in the storage by one computer (node) can be seen by all other computers of the cloud. In other words, any file containing the VEE image can be read by any computer of the cloud (or the cluster). The VEE image, advantageously, does not need to be copied to each of the computers. The HA system, in accordance with the exemplary embodiment, uses a shared cloud storage. This storage contains data reflecting the exclusive rights for files. In other words, if one node has the exclusive right for a file, it is reflected in the shared storage.

When the VEE is alive, it has exclusive rights to its own files and rejects "foreign" requests. When the VEE is not alive its files (service file, disk image) can be read by the master daemon. There are a number of definitions of High Availability (HA). For example, it can be defined as having a service available for not less than a specified amount of time (e.g., 99.99999% of the time) to the clients of one or several geographic regions. The cloud storage always needs to maintain high availability of the services provided to the clients of the cloud. The cloud service providers usually use effective backup solutions and this is a part of a service offering. However, the availability of services is not only about back up and restoration, but rather about making the cloud services work most of the time.

According to the exemplary embodiment, multiple VEEs can be running on the same host node. Each VEE provides some services to the clients. In an ideal situation, a VEE is hosted on every node as long as the node has enough resources. The cloud storage used in the exemplary embodiment is highly distributed. Thus, the VEEs can be migrated around freely across the cloud, and can reside on any node, as long as it is not down.

Providing high availability requires a method for monitoring the status of running VEEs and nodes. For example, it can be achieved by using a monitoring server issuing special keep-alive requests to the nodes or VEEs. A special application module on the node (VEE) responds to these keep-alive requests. In case the node or VEE is not responding to the keep-alive requests, the system employs a command to restart the node or re-launch the VEE. If the network location changes after the restart, the system tells the network router to use the new location(s) to provide services to the clients of the cloud. Every node has an IP address and every VEE has a URL. If the VEE migrates to the new node, the IP address changes.

Thus, it is necessary to make a new link IP-URL for the VEE. The present invention simplifies the implementation of the High Availability to the cloud by using a distributed file system. This implementation is achieved by using a special High Availability daemon (HA daemon) on each node, which is used in conjunction with the cloud storage. According to the exemplary embodiment, the VEE's data is stored using the distributed cloud storage system. The exemplary embodiment uses a distributed file system. The feature of this file system of as exclusive right on files is used.

FIG. 1 illustrates a general architecture of a data system, in accordance to the exemplary embodiment. Hardware nodes 104 use distributed data storage (not shown). The VEEs 101 are running on the hardware nodes 104. The VEE 101 data is divided into data chunks that are stored separately using chunk servers (CS) 103 and a metadata server (MDS) 102 or a set of servers. See U.S. patent application Ser. No. 13/241,081, filed Sep. 22, 2011, incorporated herein by reference in its entirety. Each VEE 104 is connected to the MDS 102 using a special client library. The client library is a library of C language (for example) methods and functions that can be used by applications for manipulation with the files in the storage.

The MDS 102 generates a map reflecting locations of the replicas of the data chunks. The MDS 102 provides the map to the nodes 104 for accessing the replicas of the data chunks located on the chunk server(s) 103. Note that the replicas of the data chunks are updated on all of the data chunk servers 103 when the VEE user modifies the data file. The MDS 102 provides a file system that implements special file system methods: temporary open and lock of the file and revoke of the opened file.

Note that temporary file open and lock is used as an alternative to keep-alive requests. The "file locked" means that the node with the VEE is alive, and the "file not locked" means that the node with VEE is dead. The "file revoke" is used for fencing off of the VEEs marked as dead (effectively restricting any write operations). While the temporary lock on a file is maintained, the file cannot be opened by any other cloud storage clients (nodes).

According to the exemplary embodiment, the data is separated into the chunks controlled by the chunk server 103. The chunks server(s) stores virtual disks used by the VEEs 101. Each VEE 101 runs service application(s). Configuration of each VEE 101 is stored in a corresponding configuration file located on the MDS 102. A router 105 has the information regarding the node 104, to which the VEE 101 belongs to. In case the node 104 fails, the services of the VEEs 101 are restored on different nodes using the configuration data acquired from the MDS 102. The nodes where the VEE 101 is re-launched inform the router 105 of a new location(s) of the VEE (s) 101.

Figure 2:
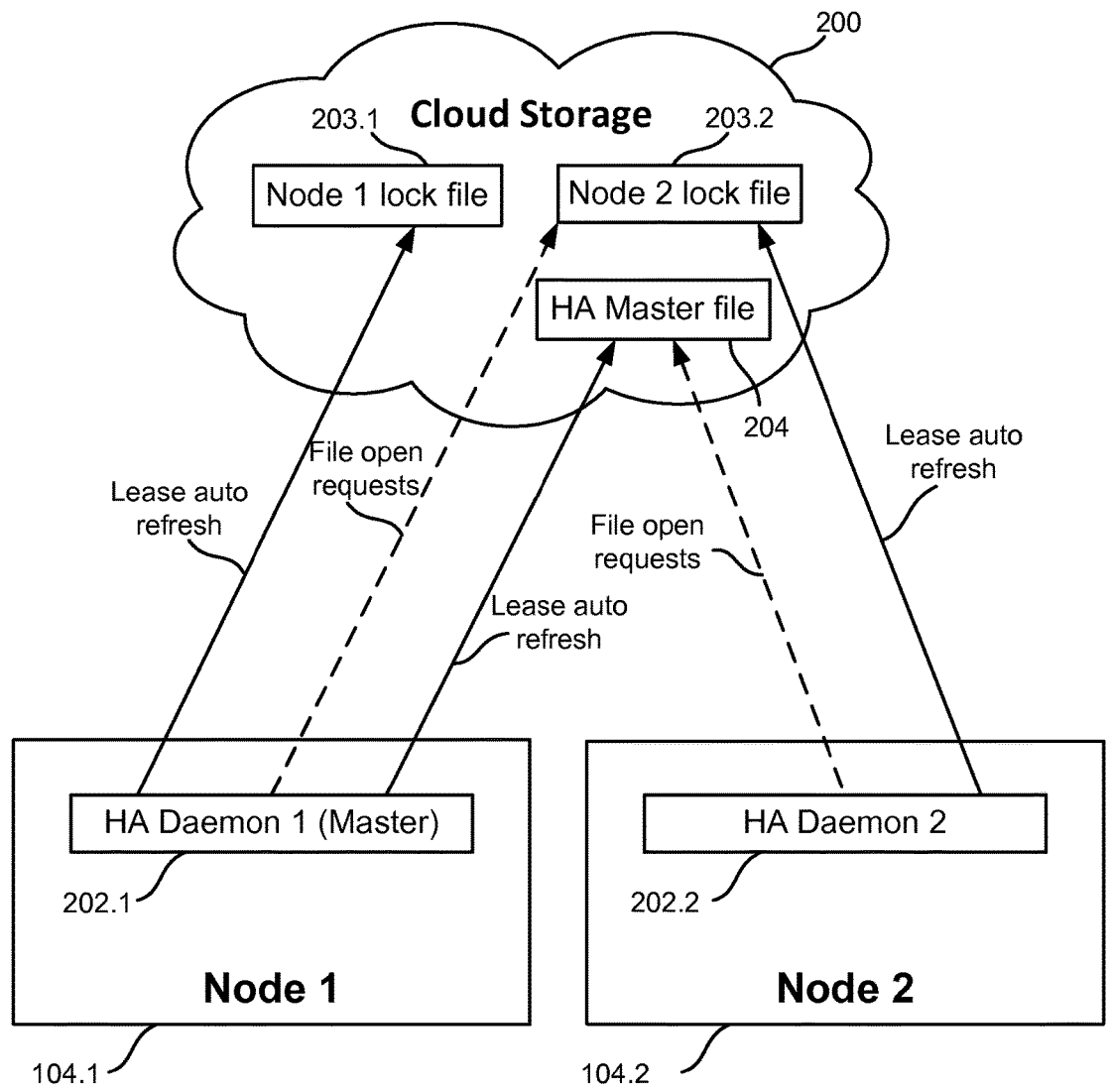
FIG. 2 illustrates communications between the nodes and a cloud storage, in accordance to the exemplary embodiment.

FIG. 2 illustrates communications between the nodes and the cloud storage, in accordance to the exemplary embodiment. High Availability daemons 202.1 and 202.2 of each of the nodes 104.1 and 104.2 (respectively) tries to open (through Cloud Storage 200 client library) a special file on MDS 102 (see FIG. 1)—i.e., node lock files 203.1 and 203.2. The 203.1 and 203.2 files' names are unique for each of the nodes 104.1 and 104.2. The files 203.1 and 203.2 are opened temporary using the special file system method. The MDS 102 (see FIG. 1) grants the lease to the nodes 104.1 and 104.2.

While the node 104.1 is active, the node's HA daemon 202.1 automatically sends requests to the node lock file 203.1 to refresh a temporary lease on the file 203.1. Thus, the file 203.1 stays locked for any other clients (e.g., HA daemon 202.2). In the next step the master HA daemon 202.1 is chosen, as discussed below. Thus, a special master HA daemon is not needed. Instead, any HA daemon, such as 202.1 can serve as a master.

According to the exemplary embodiment, all HA daemons 202 try to obtain exclusive access to a special master file 204. If one daemon succeeds, it becomes a master HA daemon as 202.1. The master daemon 202.1 can only call the lock file 203 of another node. Therefore, there is no arrow shown in FIG. 2 between HA daemon 202.2 and the file 203.1. Subsequently, the master HA daemon 202.1 tries to open the lock file of each node 203.2. If opening of the file 203.2 is denied, than the node 104.2 is alive. If the master HA daemon 202.1 can open the node's file 203.2 (i.e., to obtain exclusive lock), then the node 104.2 is marked dead, as illustrated on FIG. 3.

Figure 3:
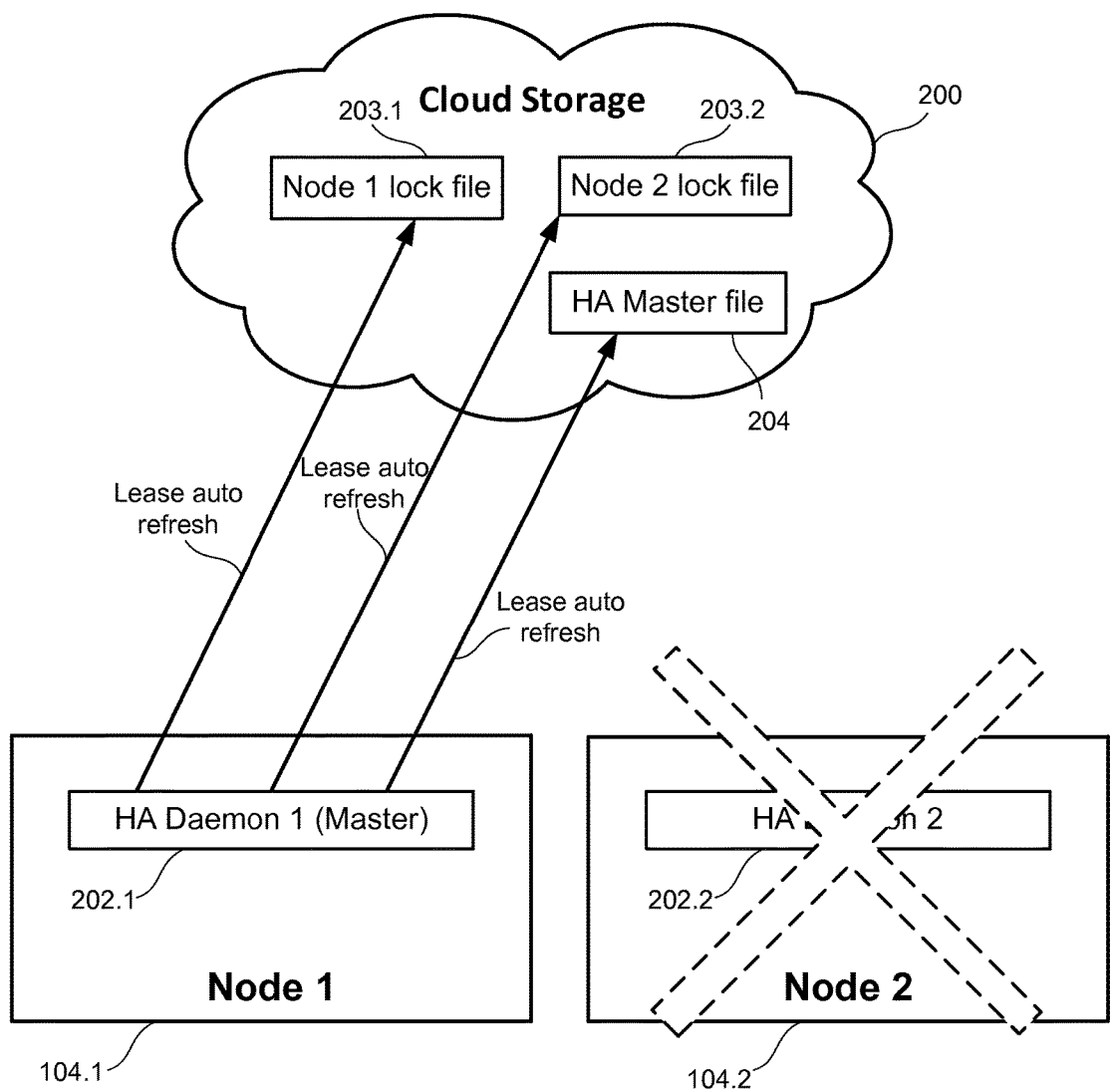
FIG. 3 illustrates a scenario where one of the nodes is not available.

FIG. 3 illustrates a scenario where one of the nodes is not available. The master HA daemon 202.1 requests fencing off of all of the VEEs 101 (see FIG. 1) on the dead node 104.2. The fencing off is implemented by using revoke system call on the node lock files 203.2. Then, for each VEE file system container file, the write operations are stopped. When the fencing is completed, the master HA daemon 202.1 requests restarting of all of the VEEs 101 that were running on a dead node 104.2. Each of the VEEs 101 can be re-launched separately on the other nodes 104 that have enough resources. In addition to restarting the VEEs 101, the dead node 104.2 is also restarted, if possible.

The OS of the node can hang and then restart itself. If the restart is not possible (hardware is broken), the system administrator is alerted and has to do it manually. Subsequently, the VEEs 101 that have been restarted communicate with the router 105 to notify the router 105 of their new physical location.

Figure 4B:
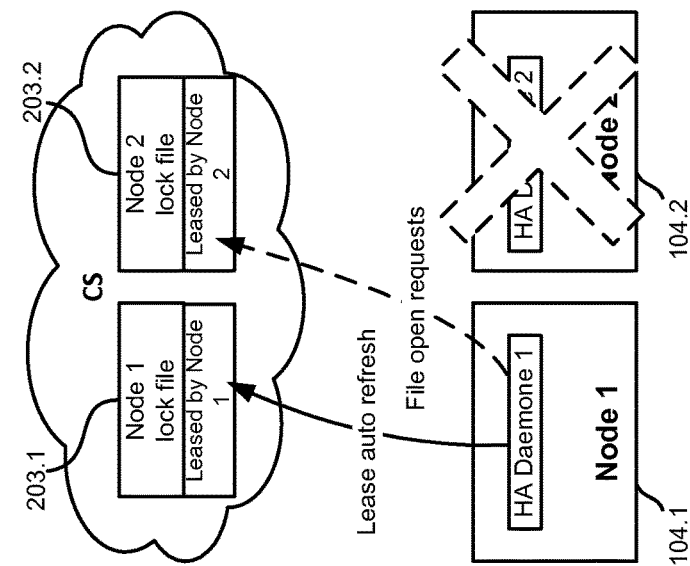
FIGS. 4A-4C illustrate a sequence of states of the nodes when one of the nodes fails.
Figure 4A:
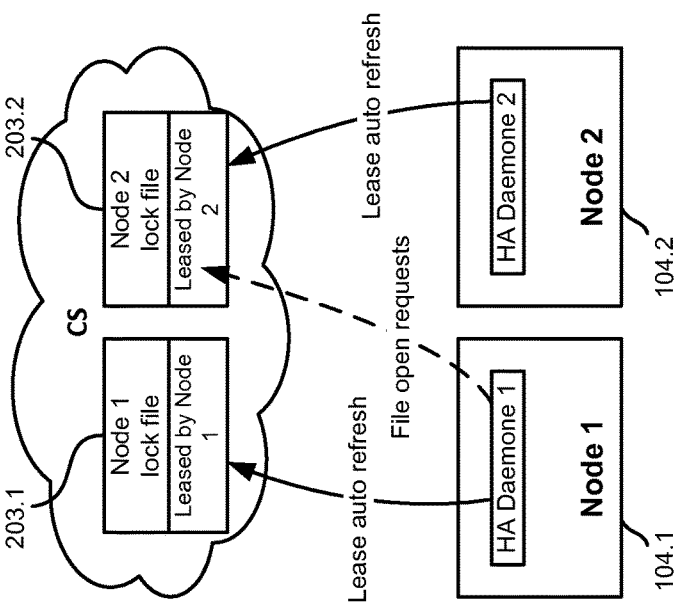
Figure 4C:
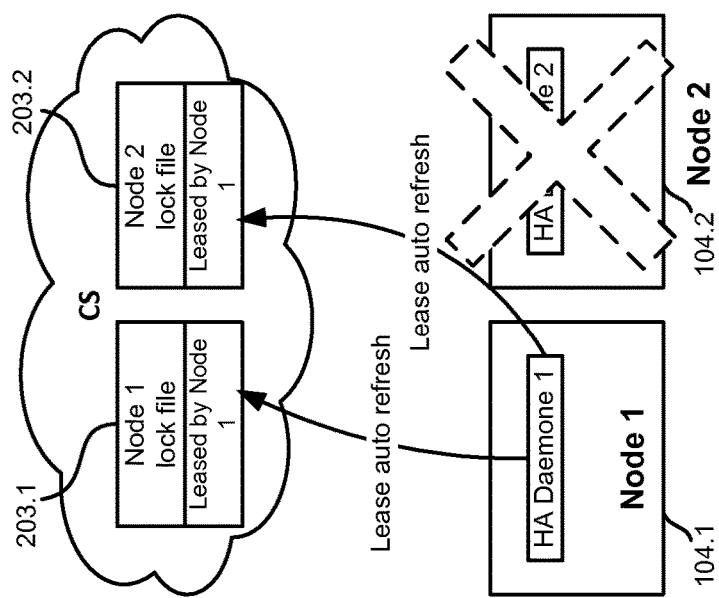

FIG. 4A-4C illustrate a sequence of states of the nodes when one of the nodes fails. Exemplary scenario of failed node is depicted in FIGS. 4B and 4C. Duration of node 104.2 down state (i.e., service delay) is configured. Note that configuration of the delay instead of minimization is needed for the following reasons. The node 104.2 can be down not because of a hardware breakdown, but because of a network temporary failure.

Thus, restoration of the network is performed over a short time (for example, up to 30 sec.). Therefore, an immediate response is not needed. According to the exemplary embodiment, the Cloud Storage 200 has a blocking mechanism. The shared cloud storage can be used by different users and is highly distributed (i.e., the data is duplicated on the different nodes). Note that replication between the copies is implemented in real-time. The cloud storage has location-independent addressing (i.e., an outside viewer has one path to particular data, though the data has copies). Thus, if the node has opened a file, a background process (thread) is started on this node. This process runs on the Cloud Storage 200 and regularly says "I still have the file." After the background thread times out, the Cloud Storage 200 considers that the file is not owned by anyone. Now, if another node requests to accesses this file, the Cloud Storage 200 will allow it. Therefore, a delay resulting in the failure of a node can include several internal timeouts. All of the timeouts can be configured in order to achieve a desired quality of service. Note that minimization of the delay can result in less efficient restoration.

According to the exemplary embodiment, a file can be opened in an exclusive mode. If the file is open in an exclusive mode by one node, the other nodes cannot open this file. The exclusive use of file is referred to as an exclusive lease, as shown in FIGS. 2-4. A daemon of each node starts a background process in order to open a file in the exclusive mode. The daemon informs the shared storage by sending the request <client_id>, where an id is the identifier of the computer in the cluster.

After the daemon has opened the file, it keeps the file open. The daemon can request to open the file on the shared storage with the name "master"—a shared file for all other nodes. However, since all nodes attempt to open this file, the shared storage will allow opening of the file master to only one of them in the exclusive mode. The node, which was able to open the file, becomes the HA master daemon node. The master daemon has to read a directory with files opened by other daemons and attempt to read each of the files.

If a node of another daemon is alive, the master daemon will not be able to open the file because of the exclusive flag. Thus, if the master daemon was able to open the file, it means that the corresponding node is off the network or has failed and need to be re-launched (if possible). According to the exemplary embodiment, the cloud storage can revoke exclusive lease.

If a node runs several VEEs, the VEEs can have their files in the shared storage. If the VEE is a VM or a Container, it keeps an open file containing the virtual disk. The file is open in an exclusive mode so no other entity can change data inside the running VM or Container. If the node has crashed, the VM or the Container needs to be re-launched on a different node.

The Container attempts to access and open the file on its disk. However, the cloud storage (having all independent locks) may have released the file monitored by the HA-daemon, but may not have enough time to release the file with the disk on a particular node. Therefore, the lease has to be taken from the file. Note that a revoke procedure is normally used only if the process is certain that the node, which owned the file, is dead. Thus, the file is open on a different node with a revoke flag indicating that a new client can write into this file but the old client cannot.

Figure 5:
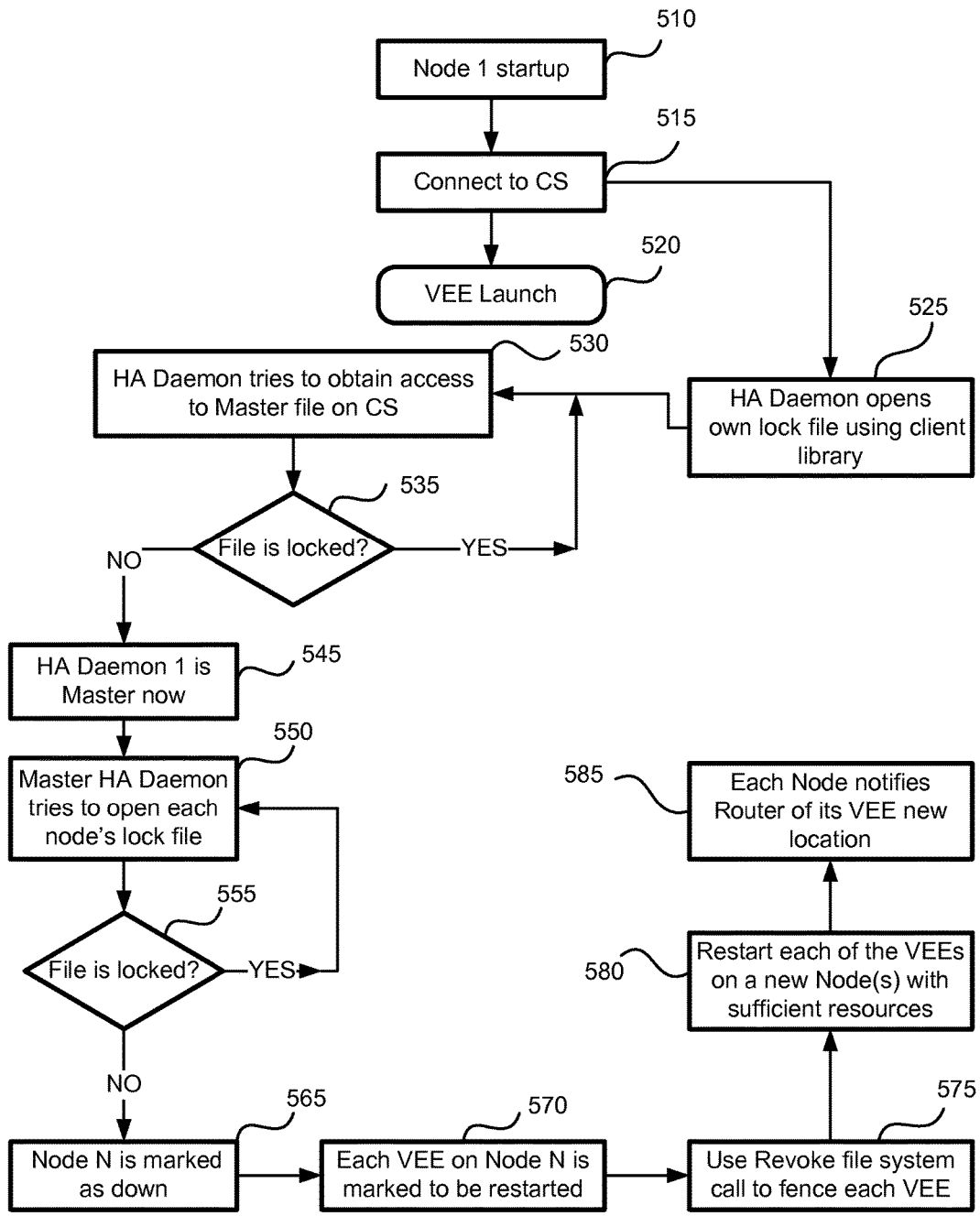
FIG. 5 illustrates a flowchart of the High Availability method, in accordance with the exemplary embodiment.

FIG. 5 illustrates a flowchart of the High Availability method in accordance with the exemplary embodiment. A first node is started in step 510. The node is connected to the cloud storage in step 515. A VEE is launched on the first node in step 520. Upon connection to the cloud storage (step 515), the HA daemon opens its own lock file using a client library in step 525. The HA daemon tries to obtain access to a master file on the cloud storage in step 530. If the file is locked (step 535), the daemon tries again in step 530.

If the file is not locked in step 535, the HA daemon of the first node becomes a master HA daemon in step 545. The master HA daemon tries to open lock files of each of the nodes in step 550. If the file is locked in step 555, the HA daemon attempts to open the file of the next node in step 550. If the file is not locked in step 555, the node N is marked as down in step 565. Each of the VEEs on the node N is marked to be re-launched on different node(s) in step 570. Subsequently, the process executes a revoke file system call to fence off each of the VEEs in step 575. Each of the VEEs from node N is re-launched on new nodes (having sufficient resources) in step 580. Subsequently, the nodes, where the VEEs are re-launched, notify a router of the new VEE location in step 585.

Figure 6:
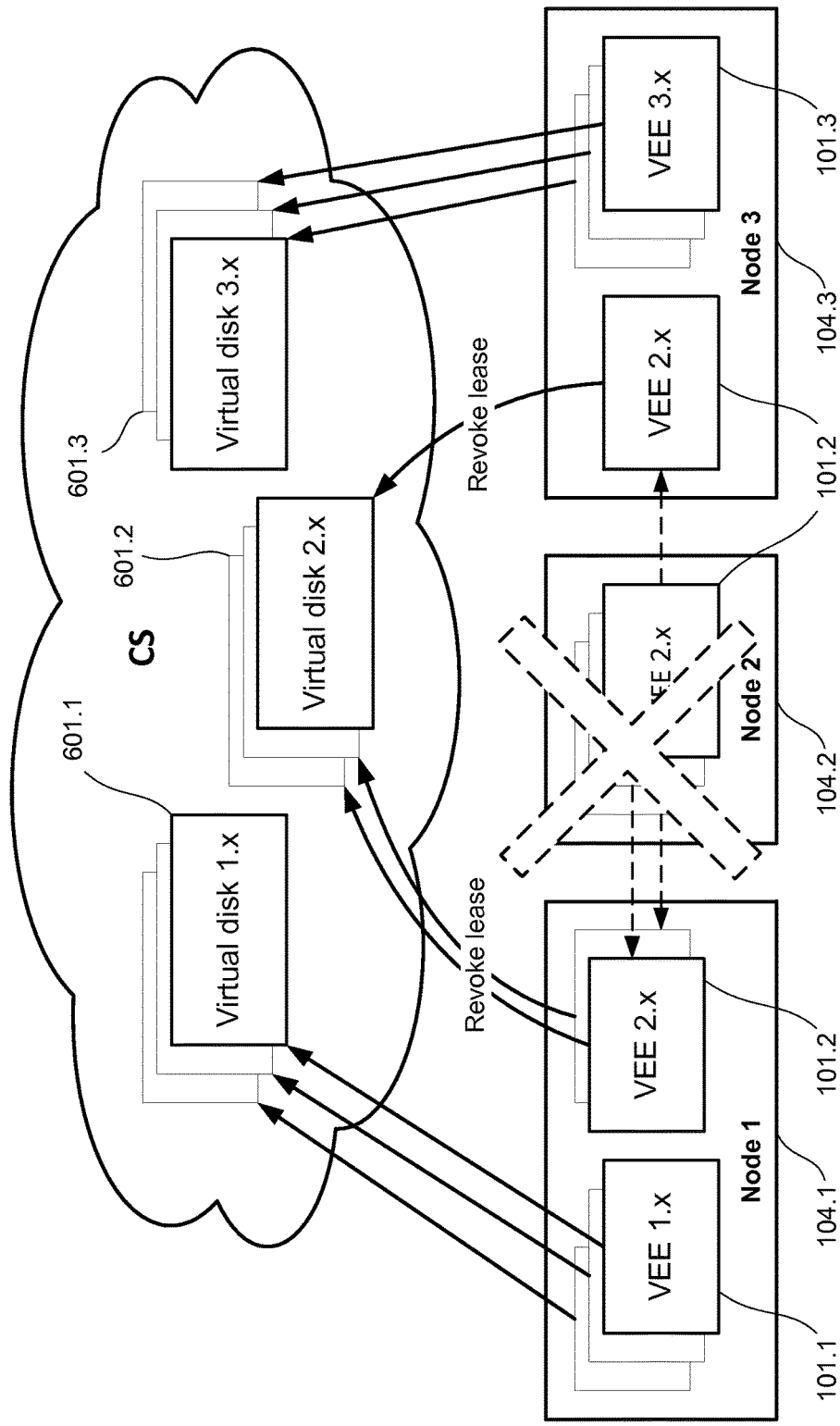
FIG. 6 illustrates a revoke mechanism, in accordance with the exemplary embodiment.

FIG. 6 illustrates a revoke lease mechanism, in accordance with the exemplary embodiment. After the node 2 (104.2) failed, all of its services—the VEE 101.2 are restored on other nodes (104.1 and 104.3). However, nothing is copied from the node 2 (104.2). Instead, configurations of VEE 101.2 are taken from the node 2 lock file 203.2 (see FIG. 3).

The file 203.2 is the file <client_id node>. This is a directory containing the files reflecting the resources of the node. Thus, the master daemon finds out about the resources of other machines and can give them to other nodes. Each VEE 101 has a virtual disk 601 located in the cloud storage. Each virtual disk 601 is the disk image—i.e., a set of client files: data and software. For example, if a client has his own site, his virtual disk contains html or/and php pages, images, media files, php and javascript scripts, server software (e.g., Apache), PHP interpreter, MySQL DB, etc. For the host operation system, a disk image is a single large file, but for a client it is a set of files.

As a further embodiment, backward migration can be implemented when a crashed node is restored in the system. Backward migration can be implemented using the same technique. When the node that was detected as "crashed" appears back online, it will register itself in the HA manager registry and will be ready to accept virtual environments for hosting. At that time, the HA manager can find those virtual environments that were "rescued" from this node on other nodes, and request "backward migration" for them. This can be done using the same MDS-based meta-storage. When the rescuing process has not been completed, backward migration is preferable since the restored node contains all required information for the rescued node.

As a further embodiment, several types of roles of nodes in the system may be implemented, where each node can implement two basic roles: to be a regular node for Virtual Environment, and to be a rescue node for any Virtual Environment by request. Nodes can be registered for HA manager purposes by marking them with different attributes in the MDS-based storage. Two bits or other flags can be used for this purpose whether the first flag or bit represents the information that the node hosts a VE on a regular basis and the second mark shows that the node has possibility to be a rescue node. Here the second flag may also have to bits showing that rescued VE already exists on the node and/or that the node has free space for rescuing a VE (can be used as a target destination for rescued VEs), correspondingly. The role of the node can be also managed by the resource manager. For example, the role of the node can be changed when the node is overloaded and no additional rescues can happen to that node.

A no regular and rescue node is a spare node to which any number of Virtual Environments from crashed nodes can be moved. Resource management needs to make sure that the number of such nodes is more than zero and send an alert to the admin otherwise.

As a further embodiment, an external/internal master can be used for detecting node crashes. When an HA "master" crashes, it takes longer to handle this crash, because some other node should take over the master lock, which usually takes more time due to this lock being heavily contested. Thus, a spare node with HA master only can be dedicated, which will have a much lower probability of a crash. In such a configuration, one spare master can be used to monitor two or more real independent clusters.

In the described scheme, the system has a mechanism for controlling and managing the router, which addresses the requests to live nodes according to node's registered roles.

If a node fails, the roles of that node are transferred to other nodes, except for the function of free space for receiving VEs data. The router management component tracks which nodes have failed, and which nodes have available space and how much available space.

If the failed node is recovered in the system, then the MDS is informed about that fact and roles for that node may be assigned according to overall situation. For example, the restored node can then continue to host those Virtual Environments or those processes of Virtual Environments, which have not yet been completely migrated to another node and started on a regular basis. This may be useful since in case of full restoration the node can contain all the data required for VE which is not yet restored on another node. As an option for unreliable nodes, the migration is continued until finishing of the process, but restored node supports full functionality of corresponding VE until completion of the migration. Another data of that node that are fully recovered on another node or nodes are useless for the system, may be deleted and corresponding disk volume may be allocated as a free space.

If a particular node has been detected as being unreliable, then it prepared to be blocked in the system. In that way even after restoration subsequent to node failure, the node will only host regular data if required until completion of the full migration of the data to another node(s). In other words, unreliable nodes are forced to perform less functions until full removal from the system.

The system verifies the nodes for reliability and failure tolerance, and the results of the verification are used to implement the above concepts and define roles for nodes. For example, a constantly failed node due to either internal hardware problems or network connectivity would lose the role of node for regular VE handling and may implement this function during migration of VE to another node, which is more stable. Furthermore, the node may be excluded from the cluster or from the whole system. Additional criteria of stable or unstable node may consist of dependencies on node age; current node load; available hardware; installed software version either OS or user software; and user-defined dependencies detected empirically or mathematically.

Figure 7:
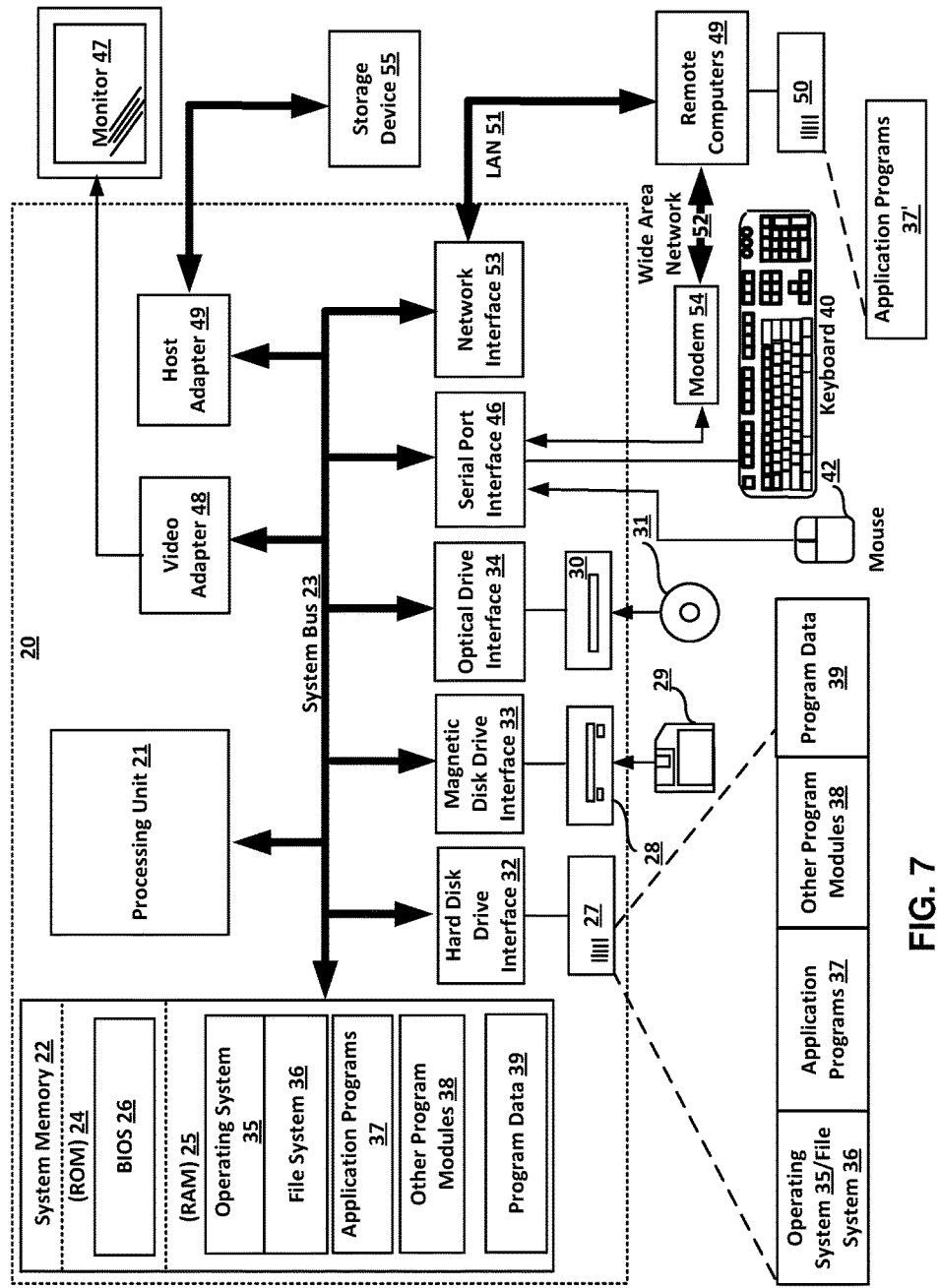
FIG. 7 illustrates a schematic diagram of an exemplary computer (node) or server that can be used in the invention.

With reference to FIG. 7, an exemplary system for implementing the invention includes a general purpose computing device in the form of a personal computer (or a node) 104 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 104, such as during start-up, is stored in ROM 24. The personal computer/node 104 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 104.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 104 includes a file system 36 associated with or included within the operating system 35, such as the WINDOWS NT™ File System (NTFS), one or more application programs 37, other program modules 38 and program data 39. A user may enter commands and information into the personal computer 104 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 104.

The computer 104 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 104 is connected to the local area network 51 through a network interface or adapter 53.

When used in a WAN networking environment, the personal computer 104 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 104, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for High Availability of services in a cloud-based infrastructure.

It should also be appreciated that various modifications, adaptations, and alternative embodiments thereof may be made within the scope and spirit of the present invention. The invention is further defined by the following claims.

What is claimed is:

1. A system for providing a high availability (HA) of services, the system comprising:
    a plurality of nodes having at least one Virtual Execution Environment (VEE) running on at least some of the nodes, where each VEE uses at least one file divided into data chunks;
    a plurality of node file locks active while accessing the active nodes;
    a plurality of chunk servers accessible by the nodes for storing the data chunks;
    a metadata server (MDS) communicating with the chunk servers and the nodes for providing metadata related to the data chunks;
    a router providing access to services hosted on the nodes;
    an HA daemon running on each node;
    an HA master daemon running on one of the nodes,
    wherein the HA daemons tracking availability of services hosted on the nodes and generate requests to HA master daemon to restore failed services and redirect router to live services instead failed;
    the activate file locks and
    master daemon re-launches a corresponding VEE on another node based on the node file locks and updates the router so as to redirect routers to active services.

2. The system of claim 1, wherein each HA daemon has a lease flag identifying the node the daemon belongs to.

3. The system of claim 2, wherein the HA master daemon detects a node as failed, if the HA master daemon cannot obtain the lease flag corresponding to the node corresponding to the node.

4. The system of claim 1, wherein the router contain service name service translating service description to network address of node providing requested service.

5. The system of claim 1, wherein after the mode fail the VEE is starting to re-launched on another node from a state when it was interrupted on the failed node.

6. The system of claim 5 further comprising restarting the VEE on a restored node after failure if the process of restarting has not been completed.

7. The system of claim 1, wherein the HA master daemon detects the failed node by sending keep-alive requests to the VEEs on the nodes.

8. The system of claim 7, further comprising a dedicated spare node for reserve hosting the HA master daemon if the main node for the HA master daemon fails.

9. The system of claim 1, wherein, if a particular node is unreliable, then that node is not used as a rescue node, and unreliable nodes perform fewer functions until removal from the system.

10. The system of claim 1, wherein at least some of the nodes are either hosting nodes or rescue nodes.

11. The system of claim 1, wherein the MDS maintains a record of a type of each node and whether a particular node has free space for rescuing a VEE.

12. A computer-implemented method for providing a high availability (HA) of services in a cloud-based environment, the method comprising:
  (a) starting a plurality of nodes;
  (b) starting an HA daemon on each node;
  (c) connecting the nodes to a storage containing files corresponding to each of the nodes and locks corresponding to each file of an active node where locks are controlled by HA daemons;
  (d) connecting the nodes to a router which keeps track of Virtual Execution Environment (VEE) locations;
  (e) launching at least one VEE on each node;
  (g) when opening files on a node, detecting a failed node by recognizing an unlocked file of that node;
  (i) re-launching VEEs of the failed node on at least one other node; and
  (j) notifying the router of new VEE locations.

13. A system for providing a high availability (HA) of services in a cloud-based environment, the system comprising:
  a processor;
  a memory coupled to the processor;
  a computer program logic stored in the memory and executed on the processor, the computer program logic for executing the steps of:
  (a) starting a plurality of nodes;
  (b) starting an HA daemon on each node;
  (c) connecting the nodes to a storage containing files corresponding to each of the nodes and locks corresponding to each file of an active node where locks are controlled by HA daemons;
  (d) connecting the nodes to a router which keeps track of Virtual Execution Environment (VEE) locations;
  (e) launching at least one VEE on each node;
  (g) when opening files on a node, detecting a failed node by recognizing an unlocked file of that node;
  (i) re-launching VEEs of the failed node on at least one other node; and
  (j) notifying the router of new VEE locations.

* * * * *